(12) United States Patent
Sakata

(10) Patent No.: US 6,793,358 B2
(45) Date of Patent: Sep. 21, 2004

(54) OUTER MIRROR FOR VEHICLE

(75) Inventor: Ikuo Sakata, Isehara (JP)

(73) Assignee: Ichikoh Industries Ltd., Tokyo (JP)

( * ) Notice: Subject to any disclaimer, the term of this patent is extended or adjusted under 35 U.S.C. 154(b) by 0 days.

(21) Appl. No.: 10/446,142

(22) Filed: May 28, 2003

(65) Prior Publication Data

US 2004/0012867 A1 Jan. 22, 2004

(30) Foreign Application Priority Data

Jun. 4, 2002 (JP) ........................................ 2002-163474

(51) Int. Cl.⁷ .............................................. G02B 7/182
(52) U.S. Cl. ...................... 359/872; 359/873; 359/874; 359/875; 359/876; 359/877; 359/841
(58) Field of Search ............................... 359/872–877, 359/841; 248/476–479

(56) References Cited

U.S. PATENT DOCUMENTS

| 4,786,156 A | | 11/1988 | Kotani et al. |
| 4,988,068 A | * | 1/1991 | Yamana et al. ............. 248/484 |
| 5,190,499 A | * | 3/1993 | Mori et al. ................... 464/36 |
| 5,432,641 A | | 7/1995 | Mochizuki |
| 5,477,392 A | * | 12/1995 | Mochizuki et al. ......... 359/841 |
| 5,594,590 A | | 1/1997 | Ishiyama |
| 5,781,354 A | * | 7/1998 | Sakata ......................... 359/841 |
| 6,130,514 A | * | 10/2000 | Oesterholt et al. .......... 318/438 |
| 6,132,050 A | | 10/2000 | Sakata et al. |
| 6,390,630 B1 | | 5/2002 | Ochs |
| 6,679,610 B2 | * | 1/2004 | Yamauchi .................... 359/841 |

FOREIGN PATENT DOCUMENTS

| JP | 6-27337 U | 4/1994 |
| JP | 7-329642 A | 12/1995 |
| JP | 8-34288 A | 2/1996 |
| WO | WO 01/03974 a1 | 1/2001 |

* cited by examiner

Primary Examiner—Mohammad Sikder
(74) Attorney, Agent, or Firm—Foley & Lardner LLP

(57) ABSTRACT

A stopper mechanism is not provided on a turning unit but is provided on a horizontal portion and a mirror assembly. Therefore, the turning unit can be used for a left outer mirror and a right outer mirror. The mirror assembly is provided with a projection of the stopper mechanism, and a base is provided with an arc groove of the stopper mechanism. Therefore, it is unnecessary to split the base into two pieces at the time of molding using a metal mold, and the base can be formed using the metal mold in a usual manner and thus, the cost of manufacturing becomes inexpensive.

9 Claims, 10 Drawing Sheets

OUTER MIRROR FOR VEHICLE

BACKGROUND OF THE INVENTION

1. Field of the Invention

The present invention relates to outer mirrors (or side mirrors) that are mounted on right and left of a vehicle body.

2. Description of the Related Art

U.S. Pat. No. 5,432,641, U.S. Pat. No. 5,594,590 and English translation in epitome of Japanese Patent Application Laid-open No. H08-034288 disclose conventional outer mirrors for a vehicle.

The disclosed outer mirror includes a base (11, 43, 11) fixed to a side surface of a vehicle body. A shaft (13, 2B, 64) is fixed to the base. A turning unit (17, 1, 14) with a turning member (18, 1A, 41) is turnably mounted on the shaft. A mirror assembly (10, 41, 13) is fixed to the turning member in such a manner that the mirror assembly (10, 41, 13) can turn around the shaft between a front retracting position and a rear retracting position. A stopper mechanism (27 and 26, 1B and 2D, 26 and 59, 87) limits a turning motion of the mirror assembly by the front retracting position and the rear retracting position. The base has a vertical portion and a horizontal portion. The base is molded using a metal mold.

In the outer mirrors disclosed in Japanese Patent Application Laid-open No. H08-034288, since the horizontal portion of the base is provided with the projection of the stopper mechanism, it is necessary to split the base into two pieces when the base is molded using a metal mold. Precisely, as shown in FIGS. 17 and 18, when a base 101 that has a horizontal portion 107 provided with a projection 102 of the stopper mechanism is to be produced, even if a slide metal mold 105 is used, the projection 102 of the base 101 and cavity 104 (female metal mold) interfere with each other, and the base 101 can not be separated from the cavity 104 (see the solid line with arrows on both sides in FIG. 18).

In the outer mirrors disclosed in U.S. Pat. No. 5,432,641, U.S. Pat. No. 5,594,590, it is necessary to split the base 101 when the base is molded using a metal mold so that the manufacturing cost increases. In FIGS. 17 and 18, a reference number 103 represents a core (male metal mold), and a reference number 106 represents the vertical portion of the base 101. In FIG. 17, hollow arrows show pulling-out directions of the core 103 and the slide metal mold 105.

Stopper mechanisms are exclusively provided for the outer mirror mounted on the left side (hereinafter, "left outer mirror") and the outer mirror mounted on the right side (right outer mirror, hereinafter), respectively.

In the outer mirrors disclosed in U.S. Pat. No. 5,432,641, U.S. Pat. No. 5,594,590, since the turning unit is provided with the stopper mechanism, a turning unit provided with a stopper mechanism exclusively for a left outer mirror and a turning unit provided with a stopper mechanism exclusively for a right outer mirror are required. Therefore, in the former publications, there is a problem that one turning unit cannot be used for the left outer mirror and the right outer mirror.

SUMMARY OF THE INVENTION

It is an object of the present invention to solve at least the problems in the conventional technology.

The outer mirror for a vehicle according to one aspect of the present invention includes a base having a first portion fixed to a body of the vehicle and a second portion fixed to and extending from the first portion; a turning unit having a shaft fixed to the second portion and a turning member turnably mounted on the shaft; a mirror assembly fixed to the turning member and which can turn around the shaft between a front retracting position and a rear retracting position; and a stopper mechanism which limits a turning motion of the mirror assembly between the front retracting position and the rear retracting position. The stopper mechanism includes an arc groove, having two ends, provided in the second portion and a projection provided on the mirror assembly and which abuts against the ends of the arc groove to stop the turning motion of the mirror assembly.

Since the mirror assembly is provided with the projection and the base is provided with the arc groove, there is no projection of the stopper mechanism on the side of the base. Therefore, when the base is to be produced, the base and the metal mold do not interfere with each other, and the base can be molded by a metal mold in a usual manner. Since it is unnecessary to split the base into two pieces when the base is molded the metal mold, the cost of manufacturing becomes inexpensive as compared with the conventional outer mirror in which it is necessary to split the base into two pieces when the base is molded the metal mold.

The stopper mechanism is not provided on the turning unit but is provided on the horizontal portion of the base and the mirror assembly. A stopper mechanism for the left outer mirror and a stopper mechanism for the right outer mirror need not be provided on the turning unit, and they can be provided on the mirror assembly for the left base and the mirror assembly for the right base, respectively. Therefore, the turning unit can be used for both the left and right outer mirrors.

The other objects, features and advantages of the present invention are specifically set forth in or will become apparent from the following detailed descriptions of the invention when read in conjunction with the accompanying drawings.

DETAILED DESCRIPTION

Figure 1:
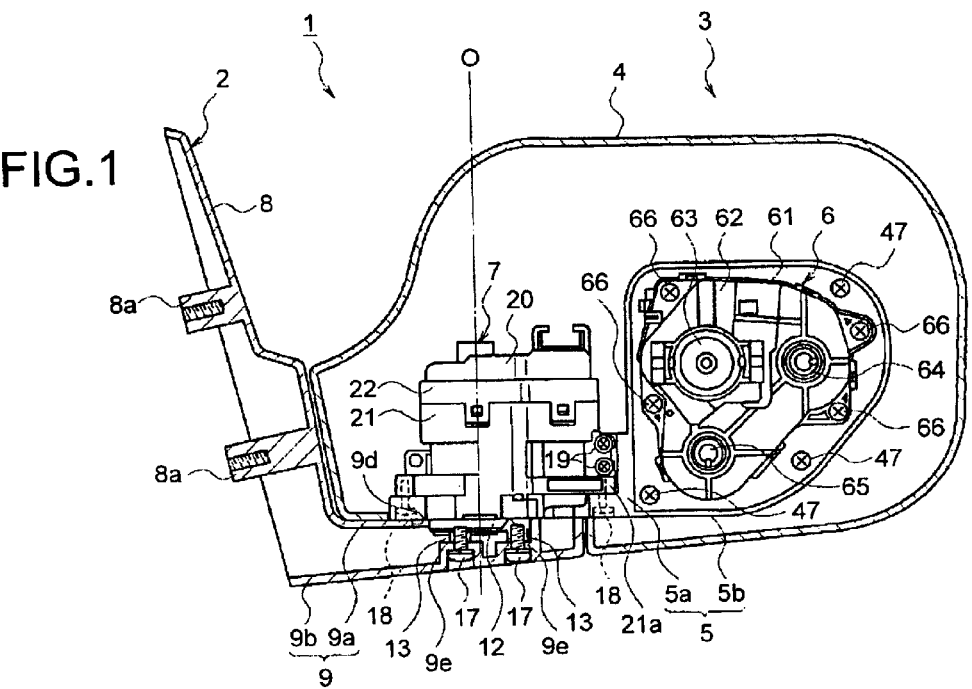
FIG. 1 is a partially cut-away (base and housing) front view of an outer mirror according to an embodiment of the invention.
Figure 2:
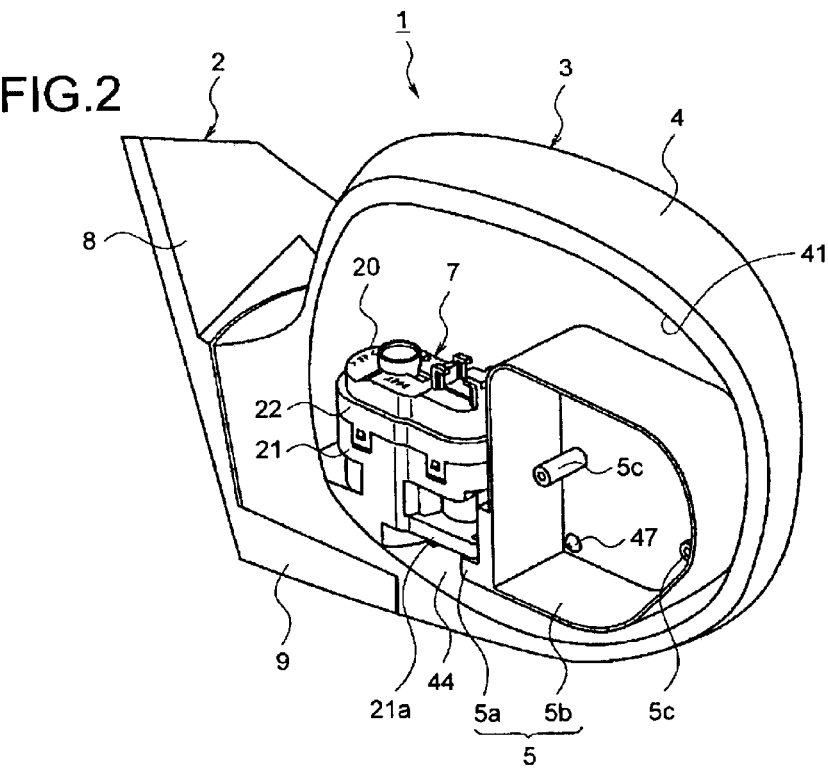
FIG. 2 is a perspective view of the outer mirror from which a mirror body and a tilting unit are omitted.
Figure 3:
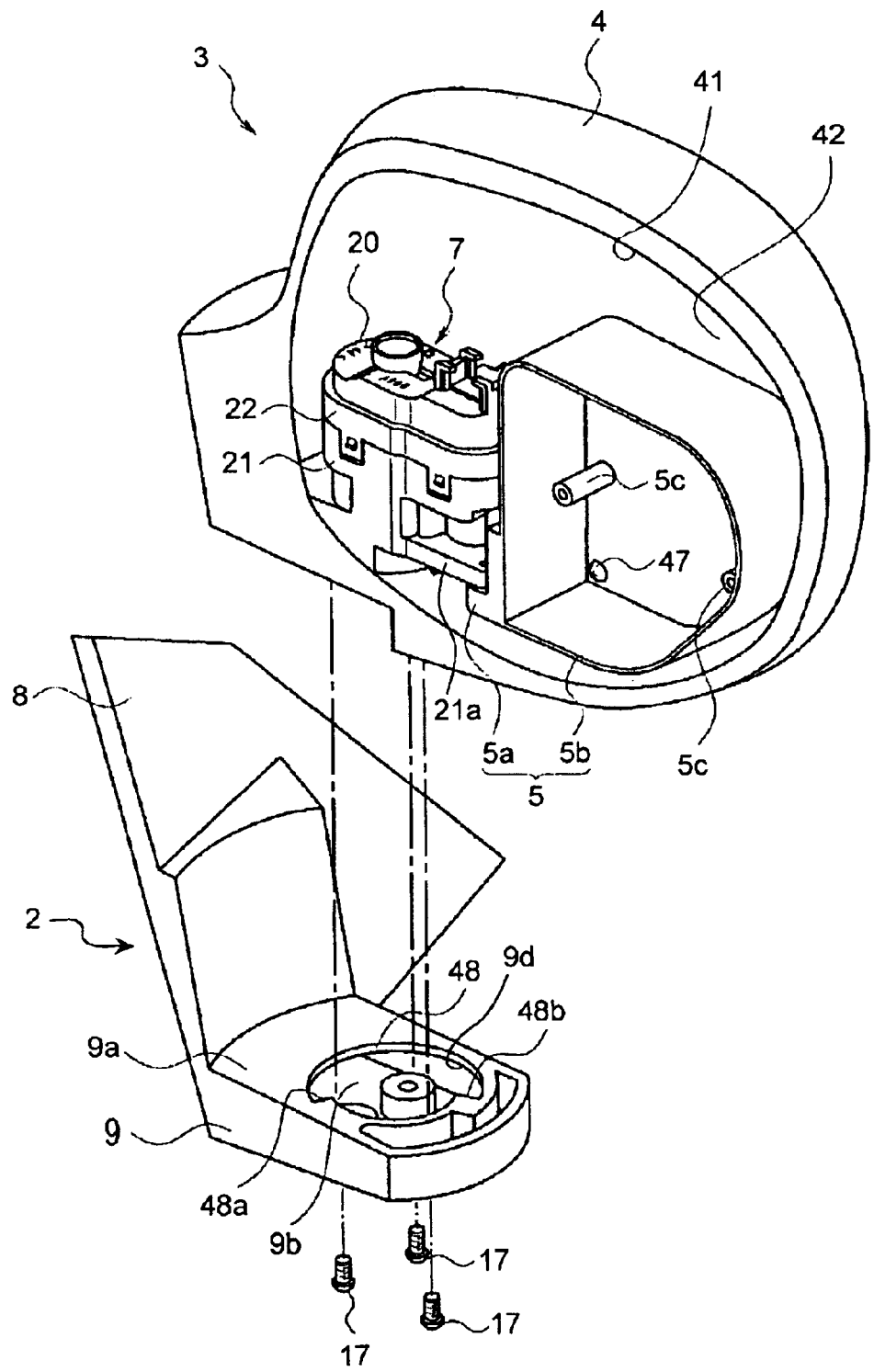
FIG. 3 is an exploded perspective view that shows a state in which the mirror assembly (mirror body and tilting unit are omitted) is mounted on the base.
Figure 4:
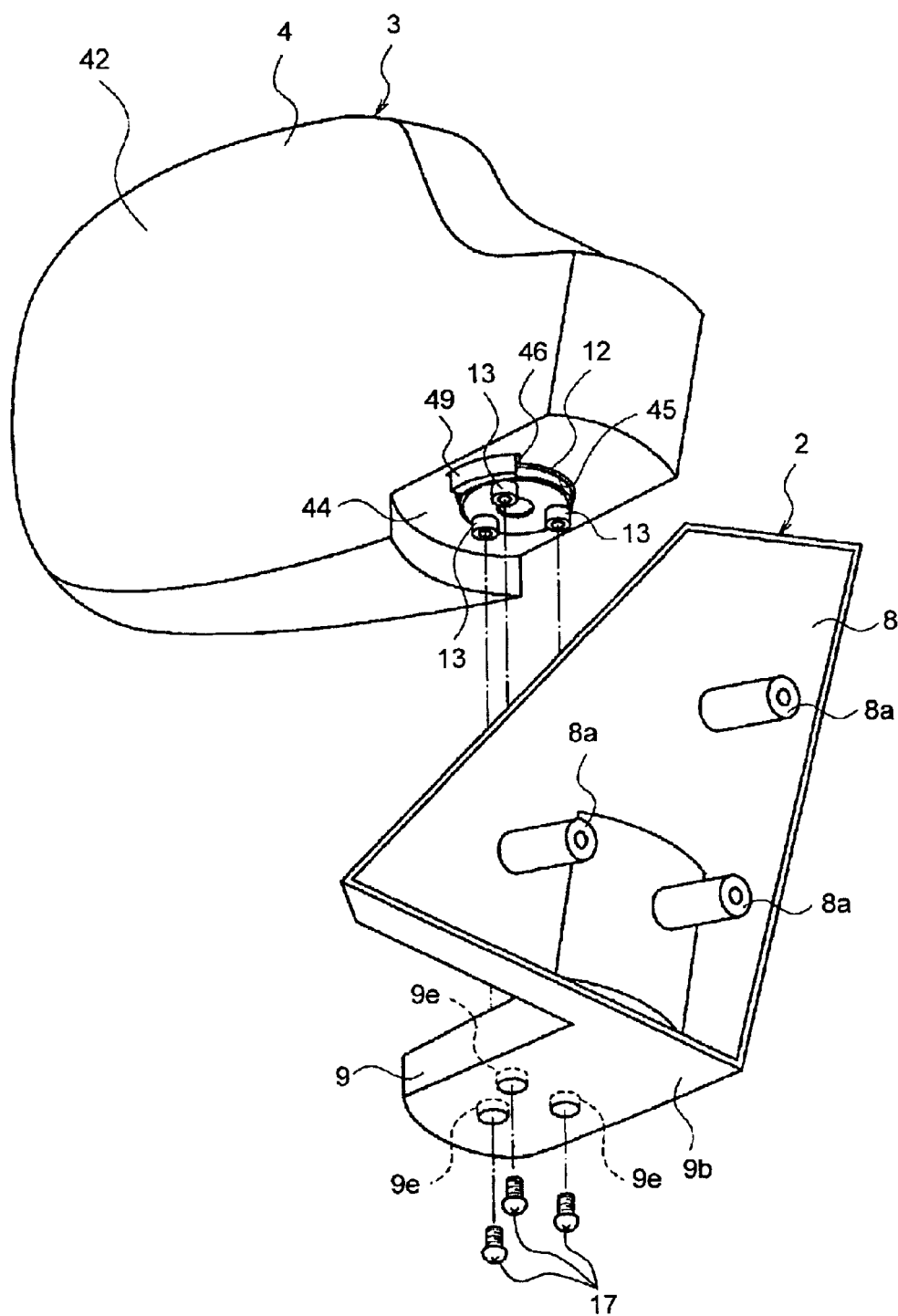
FIG. 4 is an exploded perspective view that shows the mounting state shown in FIG. 3 as viewed from a different angle.

Exemplary embodiments of an outer mirror for a vehicle according to the present invention will be explained below with reference to the accompanying drawings. For explanation purpose, an outer mirror mounted on a right door of the vehicle body will be explained.

In the drawings, a reference number 1 represents the outer mirror. In the same manner as shown in FIG. 16, the outer mirror 1 has a base 2, a turning unit 7, a mirror assembly 3, and a stopper mechanism (opposite ends 48a and 48b of an arc groove 48, and a projection 49).

As shown in FIGS. 1 to 4 and 16, the base 2 has a vertical portion 8 fixed to a side surface of the vehicle body, and a horizontal portion 9 extending substantially horizontally from the vertical portion 8. The base 2 is formed into a substantially L-shape. The vertical portion 8 is formed along a wall surface of the vehicle body (door). A plurality of (three, in this embodiment) screw bosses 8a, 8a and 8a project from a back surface of the vertical portion 8. By screwing screws (not shown) into the screw bosses 8a, 8a and 8a from the inside of the vehicle, the vertical portion 8 is fixed to the wall surface of the horizontal portion 9. The horizontal portion 9 comprises an upper wall 9a and a lower wall 9b. The upper wall 9a is provided with a substantially circular opening 9d. The lower wall 9b is integrally provided with a plurality of (three, in this embodiment) fixed portions 9e within a range of the opening 9d.

Figure 5:
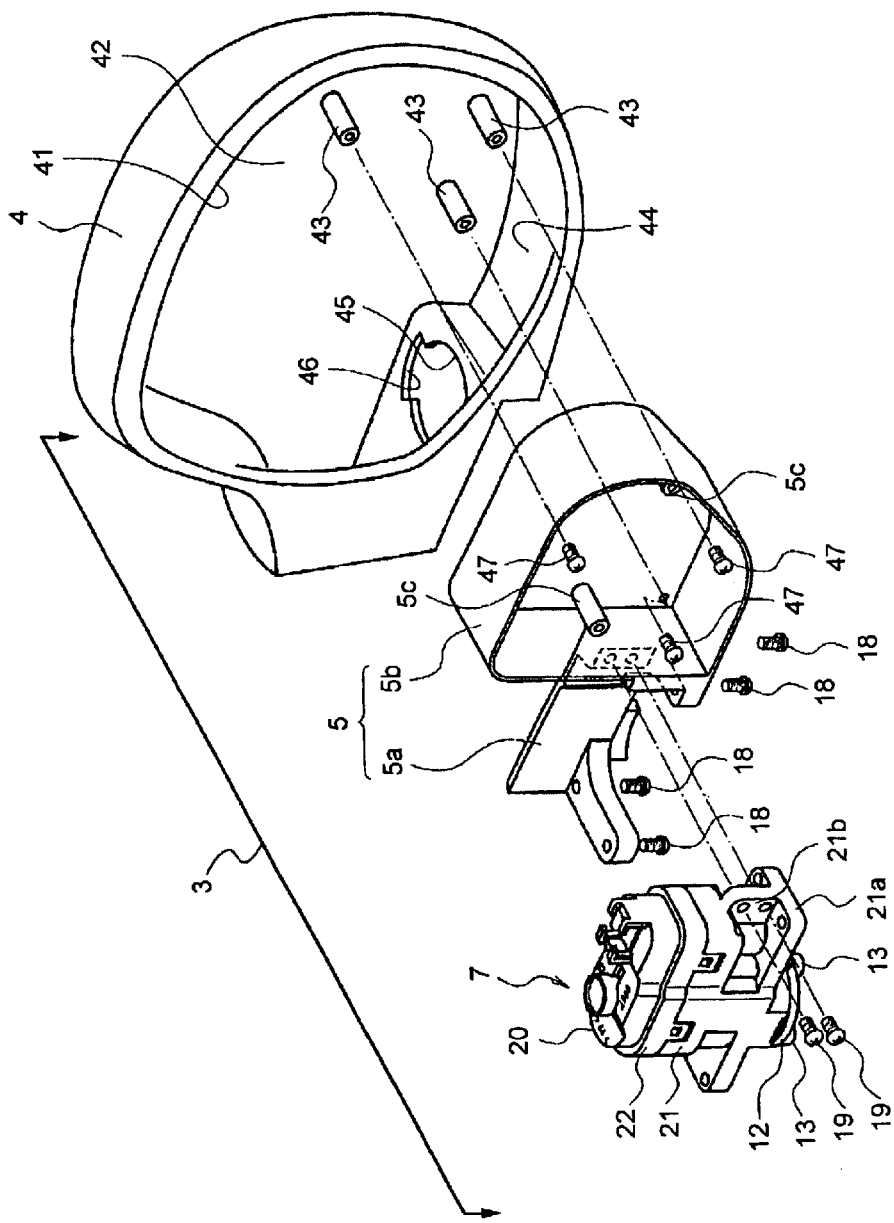
FIG. 5 is an exploded perspective view of the mirror assembly from which the mirror body and the tilting unit are omitted.
Figure 6:
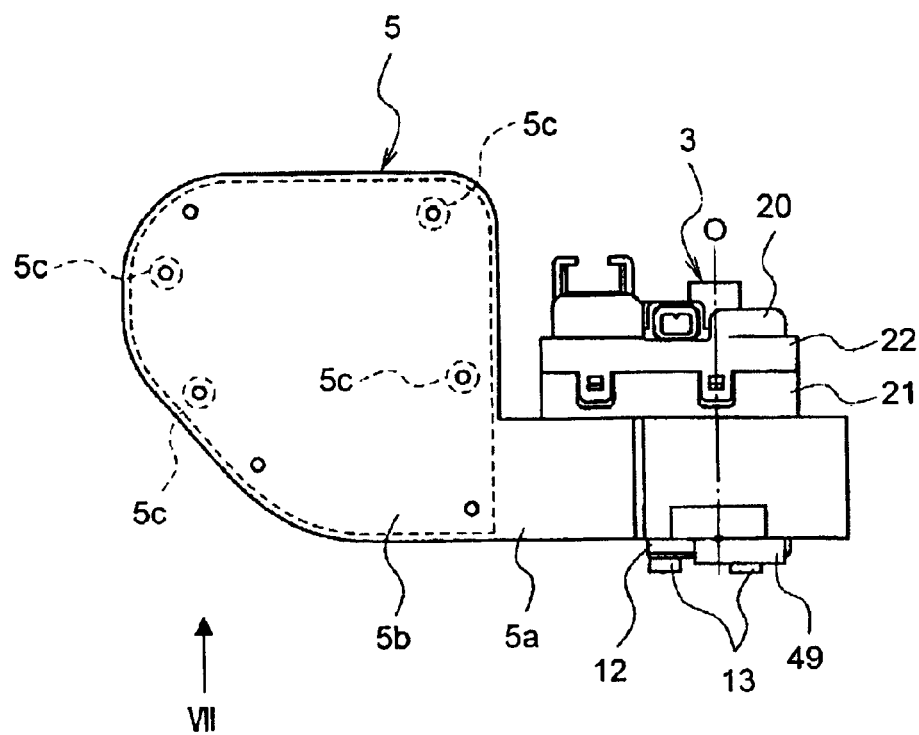
FIG. 6 is a rear view that shows a state in which a turning unit is fixed to a bracket.
Figure 7:
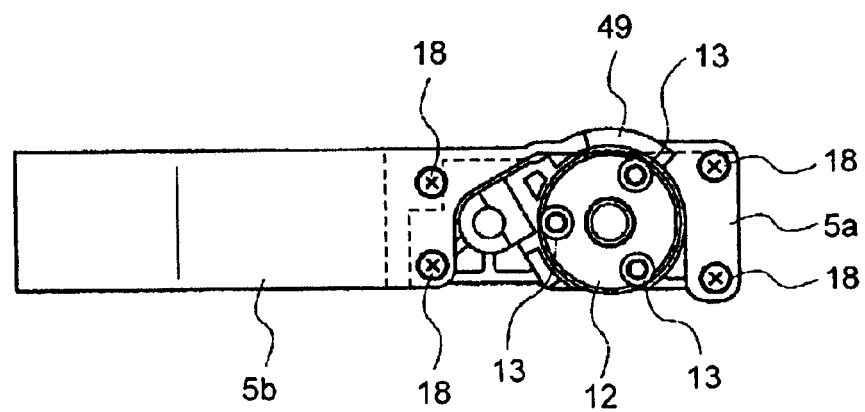
FIG. 7 is a view taken along an arrow VII in FIG. 6.
Figure 8:
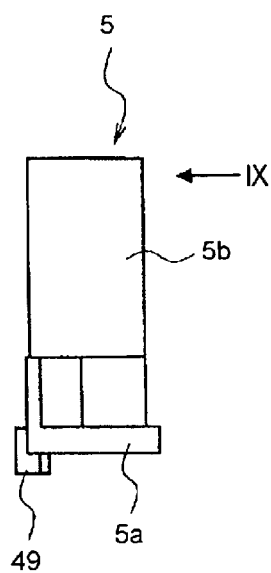
FIG. 8 is a side view of the bracket.
Figure 9:
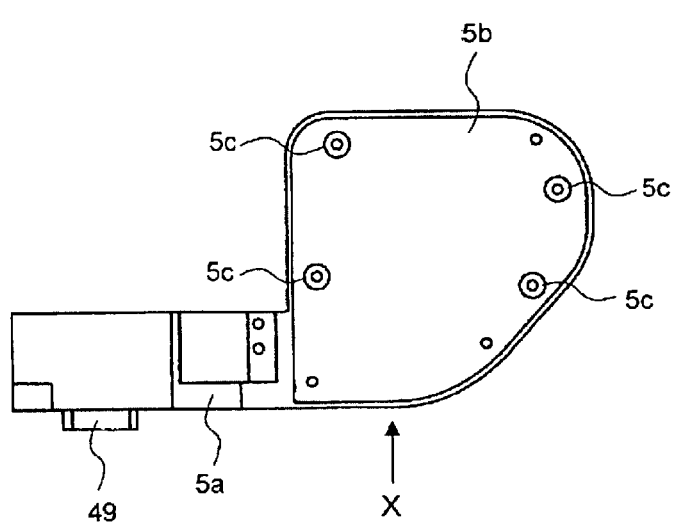
FIG. 9 is a view taken along an arrow IX in FIG. 8.
Figure 10:
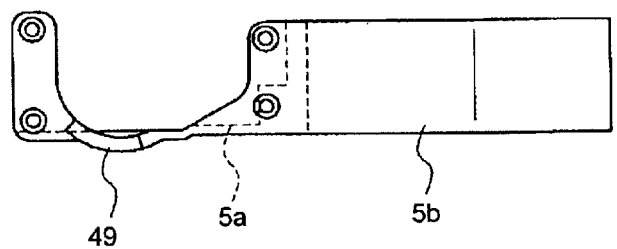
FIG. 10 is a view taken along an arrow X in FIG. 9.
Figure 11:
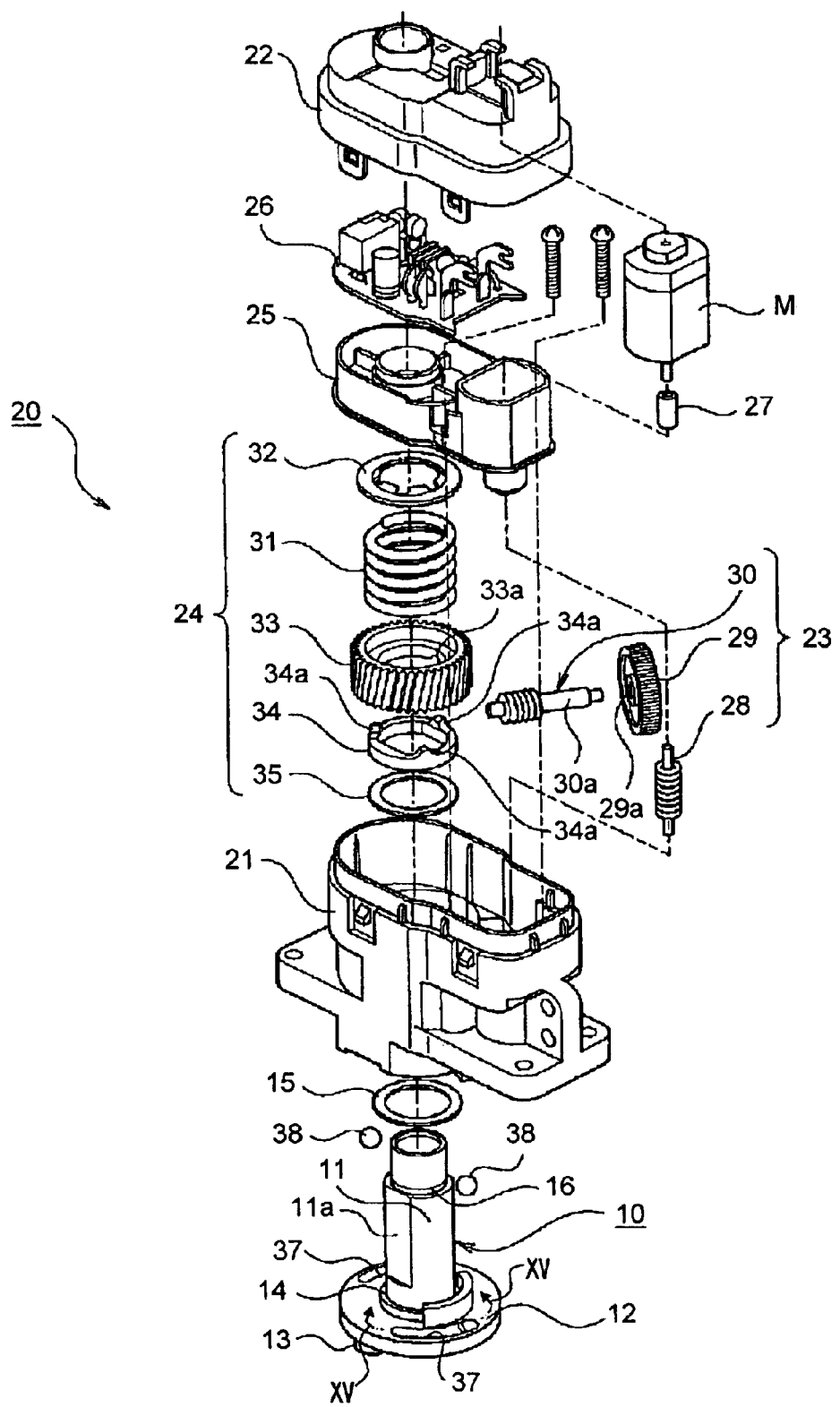
FIG. 11 is an exploded perspective view that shows the turning unit.

As shown in FIGS. 1 to 7 and 11, the turning unit 7 has a shaft (vertical shaft) 10 as a fixed member which is fixed to the horizontal portion 9 of the base 2, and a turning member 20 which is turnably mounted on the shaft 10. As shown in FIG. 11, the shaft 10 has a shaft body 11, and a circular flange 12 which is integrally formed on a lower end of the shaft body 11. A plurality of (for example, three) screw bosses 13, 13 and 13 integrally project from a lower surface of the flange 12. The flange 12 is inserted into the opening 9d of the upper wall 9a of the horizontal portion 9 of the base 2. Screws 17, 17 and 17 are screwed into the screw bosses 13, 13 and 13 of the flange 12 through the fixed portion 9e of the lower wall 9b of the horizontal portion 9 of the base 2. With this design, the shaft 10 is fixed to the horizontal portion 9 of the base 2. An upper surface of the flange 12 is provided with a thrust surface 14. The thrust surface 14 is formed in a step-shape at a root portion of the shaft body 11. The turning member 20 is slidably mounted on the thrust surface 14 through a washer 15. As shown in FIG. 5, the turning member 20 comprises a lower case 21 and an upper case 22. The lower case 21 is integrally provided with mounting plates 21a and 21b.

Figure 16:
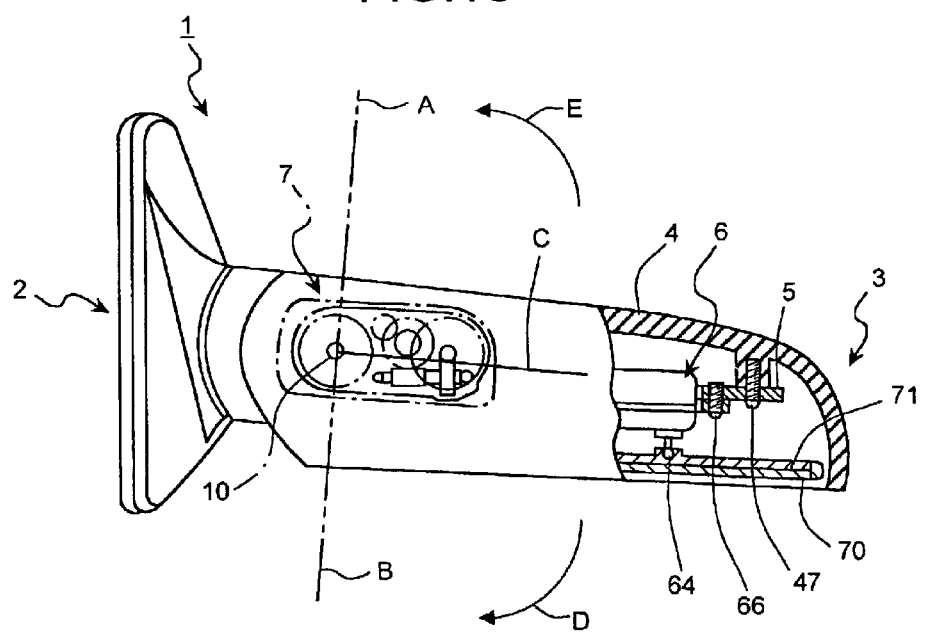
FIG. 16 is a plan view that shows a state in which a portion of the housing is cut away.
Figure 17:
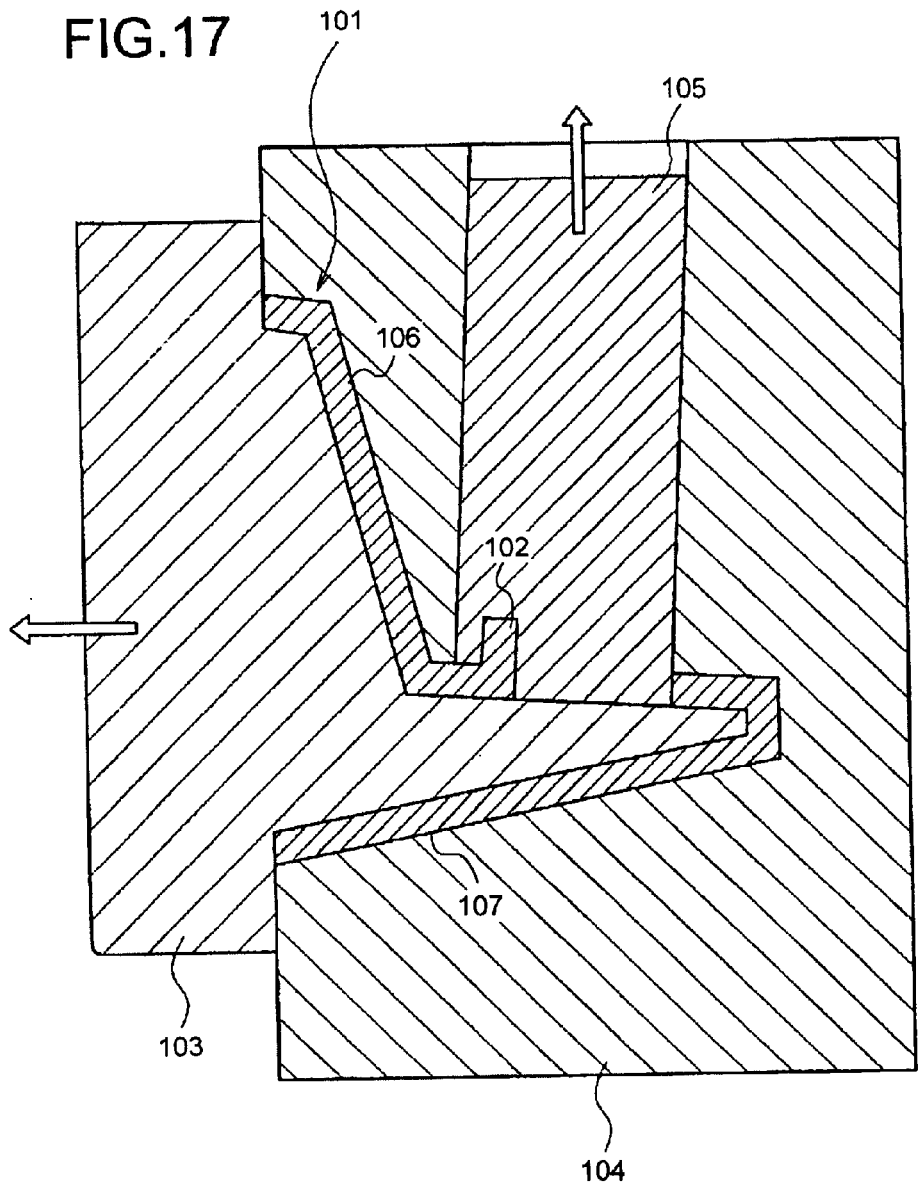
FIG. 17 is an explanatory view that shows a state in which the base that has a horizontal portion provided with a projection of the stopper mechanism is molded using a metal mold.
Figure 18:
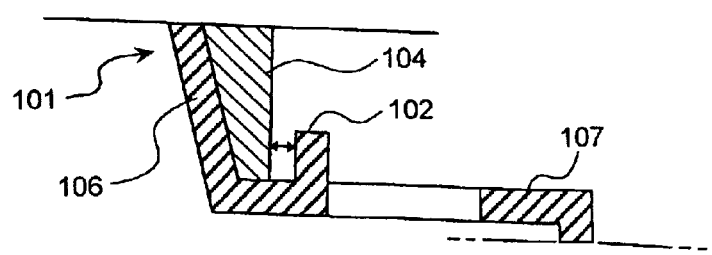
FIG. 18 is an explanatory view that shows a state in which in a base that has a horizontal portion provided with a projection of the stopper mechanism, the projection of the base and a cavity interfere with each other and the base can not be separated from the cavity.

As shown in FIG. 16, the mirror assembly 3 can turn around an axis C of the shaft 10 between a front retracting position A (position shown with a phantom line in FIG. 16) and a rear retracting position B (position shown with a dashed line in FIG. 16). As shown in FIGS. 1 to 5 and 16, the mirror assembly 3 comprises a mirror body 70 that has a reflecting surface (mirror surface), a tilting unit 6 which tiltably supports the mirror body 70, a housing 4 that has a rear opening 41, and a bracket 5 fixed in the housing 4.

A mirror holder 71 is fixed to a back surface of the mirror body 70. The tilting unit 6 tiltably holds the mirror body 70 through the mirror holder 71. The tilting unit 6 in this embodiment is an electric tilting unit, and has a casing 62 as shown in FIGS. 1 and 16. The casing 62 is provided at its substantially central portion with a ball joint 63. The ball joint 63 tiltably supports the mirror body 70 through the mirror holder 71. The casing 62 supports a vertically advancing/retreating rod 65 and a laterally advancing/retreating rod 64 such that the rods can advance and retreat. A ball of the vertically advancing/retreating rod 65 and a ball of the laterally advancing/retreating rod 64 are turnably supported by the mirror holder 71. A vertically driving unit (not shown) and a laterally driving unit (not shown) are accommodated in the casing 62. Each the vertically driving unit and the laterally driving unit comprises a motor and a reduction gear. The vertically advancing/retreating rod 65 and the laterally advancing/retreating rod 64 are mounted on the vertically driving unit and the laterally driving unit, respectively. A driver operates a remote control switch (not shown) provided in a passenger room of the vehicle. With this operation, the vertically driving unit and the laterally driving unit are actuated, and the vertically advancing/retreating rod 65 and the laterally advancing/retreating rod 64 advance and retreat. With this motion, the mirror body 70 tilts through an arbitrary angle vertically around a line segment connecting a center of the ball joint 63 and a center of the ball of the laterally advancing/retreating rod 64, and laterally around a line segment connecting the center of the ball joint 63 and a center of the ball of the vertically advancing/retreating rod 65. The tilting unit 6 can tilt the mirror body 70 vertically and laterally through an arbitrary angle. That is, a driver of the vehicle can adjust the reflecting surface of the mirror body 70 through an arbitrary angle by means of remote control.

As shown in FIGS. 1 to 5 and 16, the housing 4 is formed into a box-like shape that has a rear opening 41. A front wall 42 of the housing 4 is provided with a plurality of (three, in this embodiment) screw bosses 43, 43 and 43. A bottom wall 44 of the housing 4 is provided with a substantially circular opening 45.

The bracket 5 is formed from resin (e.g., resin containing glass fiber) that has strength higher than that of the housing 4. As shown in FIGS. 1 to 3 and 5 to 10, the bracket 5 comprises a turning unit-mounting portion 5a, and a tilting unit-mounting portion 5b provided at an outer side than the turning unit-mounting portion 5a in a widthwise direction of the vehicle. The tilting unit-mounting portion 5b is formed into a box-like shape whose rear side is opened. The tilting unit-mounting portion 5b is provided with a plurality of (four, in this embodiment) screw bosses 5c, 5c, 5c and 5c. Mounting plates 21a and 21b of the lower case 21 of the turning member 20 of the turning unit 7 are fixed to the turning unit-mounting portion 5a by means of screws 18, 18, 18 and 18 and screws 19 and 19. The casing 62 of the tilting unit 6 is fixed to the screw bosses 5c, 5c, 5c and 5c of the tilting unit-mounting portion 5b by means of screws 66, 66, 66 and 66. The bracket 5 is fixed to the screw bosses 43, 43 and 43 of the housing 4 by means of screws 47, 47 and 47. With this design, the tilting unit 6, the turning unit 7 and the mirror body 70 are accommodated in the housing 4 through the bracket 5. The mirror body 70 is located in the rear opening 41 of the housing 4. The flange 12 projects from inside to outside of the housing 4 from the opening 45 of the housing 4, and is fixed to the horizontal portion 9 of the base 2. The mirror body 70, the tilting unit 6, the housing 4 and the bracket 5 constitute the mirror assembly 3. The mirror assembly 3 is fixed to the turning member 20 of the turning unit 7 through the bracket 5. With this design, the, mirror assembly 3 can turn between the front retracting position A and the rear retracting position B around the shaft 10.

The turning unit 7 operates with electricity. In this example, the motor M, a driving-force transmitting mechanism 23, a clutch mechanism 24, a positioning mechanism and a switch circuit (not shown) are accommodated in the turning member 20 comprising the lower case 21 and the upper case 22 of the turning unit 7.

The motor M is held by a holding case 25 which is fixed to the lower case 21 by screws. The motor M is electrically connected to a vehicle-mounted battery (not shown) through the switch circuit on the circuit substrate 26 held by the holding case 25. The motor M is driven by operating a remote control switch (not shown) in the passenger room.

The driving-force transmitting mechanism 23 comprises a first worm gear 28 mounted on an output shaft of the motor M through a joint 27, a worm wheel 29 meshing with the first worm gear 28, and a second worm gear 30 that has a rotation shaft 30a. One end of the rotation shaft 30a is movably and non-rotatably mounted on a noncircular center through hole 29a of the worm wheel 29. The second worm gear 30 meshes with a clutch gear 33 of the clutch mechanism 24.

The clutch mechanism 24 is for turning the mirror assembly 3 around the shaft 10 without applying excessive load to the motor M and the driving-force transmitting mechanism 23 when external force is applied to the mirror assembly 3. The clutch mechanism 24 has a coil spring 31 as a "biasing unit", a retainer 32 which holds an upper end of the coil spring 31, a clutch gear 33, a clutch wheel 34 and a washer 35. The retainer 32 is a push nut. A mounting portion 11a is formed on an outer peripheral surface of the shaft body 11 of the shaft 10. The clutch wheel 34 engages with the mounting portion 11a and is non-rotatably fixed to the shaft 10. A lower surface of the clutch wheel 34 is flat, and is pushed against and in contacted with a bottom surface of the lower case 21 through a washer 35. A clutch wheel 34 is provided at its upper surface with a convex engaging pawl 34a. The clutch gear 33 is rotatably mounted on the shaft 10.

The clutch gear 33 is provided at its lower surface with an engaging recess 33a which can be engaged with and disengaged from the engaging pawl 34a of the clutch wheel 34. In a state in which the coil spring 31 is accommodated in the central accommodating portion of the clutch gear 33, if the retainer 32 is fitted into the concave portion 16 of the shaft body 11 of the shaft 10, the coil spring 31 is compressed, and the clutch wheel 34 and the clutch gear 33 are pushed against each other by elastic repulsion of the coil spring 31. The turning member 20 is biased against the thrust surface 19 of the base 2 of the shaft 10 through the washer 15.

In a normal state, the engaging pawl 34a and the engaging recess 33a engage with each other, and the clutch wheel 34 and the clutch gear 33 are in engagement with each other, and the clutch gear 33 is fixed to the shaft 10. Therefore, if the motor M is driven, the turning member 20 turns with respect to the shaft 10 through the driving-force transmitting mechanism 23 and the clutch gear 33. If a rotation force stronger than an elastic force of the coil spring 31 is applied to the mirror assembly 3 manually or by an external force such as unexpected collision, the clutch wheel 34 and the clutch gear 33 are disengaged from each other, the clutch gear 33 becomes capable of turning with respect to the shaft 10, and the mirror assembly 3 can turn without applying excessive load to the motor M.

Figure 15:
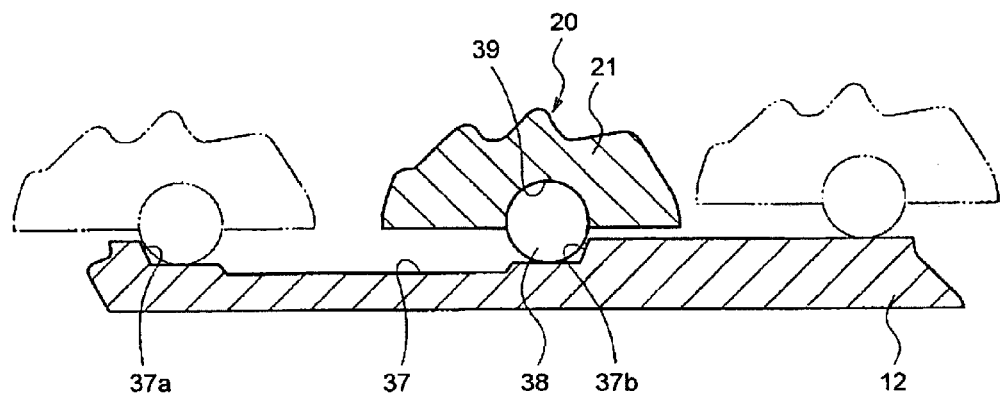
FIG. 15 is an explanatory sectional view taken along a line XV—XV in FIG. 11.

As shown in FIG. 15, the positioning mechanism comprises a pair arc grooves 37 provided in an upper surface of the flange 12 of the shaft 10, and a pair of rolling elements 38 held by a lower surface of the lower case 21 of the turning member 20 such that the rolling elements 38 can roll. The upper surface of the flange 12 of the shaft 10 and the lower surface of the lower case 21 of the turning member 20 are opposed to each other. Each the rolling element 38 is held in a hemispherical retainer 39 recessed in a lower surface of the lower case 21 of the turning member 20 such that the rolling element 38 can roll.

The rolling elements 38 are respectively disposed in the arc grooves 37. When the rolling element 38 is located on one end 37a of the arc groove 37 as shown with a chain line in FIG. 15, the mirror assembly 3 is arranged to be located in the rear retracting position B as shown in FIG. 16. When the rolling element 38 is located on the other end 37b of the arc groove 37 as shown with a solid line in FIG. 15, the mirror assembly 3 is arranged to be located in a usage position (developed position) C as shown in FIG. 16. Heights of the both ends 37a and 37b of the arc groove 37 are set such that when the turning member 20 is driven and turned by the motor M, the rolling element 38 can not run on the arc groove 37.

When the mirror assembly 3 is electrically turned, the mirror assembly 3 can turn between the usage position C and the rear retracting position B only within a range in which the rolling element 38 can roll within the arc groove 37. If the turning motion of the mirror assembly 3 is physically stopped by the ends 37a and 37b of the arc groove 37, the switch circuit detects an excessive load applied to the motor M and interrupts the current to the motor M. As a result, the mirror assembly 3 can be located in the usage position C and the rear retracting position B.

When the mirror assembly 3 is turned manually or by an external force such as unexpected collision, the clutch mechanism 24 is brought into a disengaged state by the external force and at the same time, the rolling element 38 is separated from the arc groove 37 as shown with the phantom line in FIG. 15, and the mirror assembly 3 can freely turn independently of the arc groove 37.

When the mirror assembly 3 turns independently of the arc groove 37 in this manner, in order to stop the mirror assembly 3 in the front retracting position A and the rear retracting position B, a stopper mechanism (a stopper mechanism for accommodation) is provided. As shown in FIGS. 3, 4, 6 to 10 and 12 to 14, the stopper mechanism comprises both ends 48a and 48b of the arc groove 48 provided in the upper wall 9a of the horizontal portion 9 of the base 2, and a projection 49 projecting into the arc groove 48 from the bracket 5 constituting the mirror assembly 3. The projection 49 projects from the bottom wall 44 of the housing 4 through a notch 46 provided in the opening 45 of the bottom wall 44 of the housing 4, and projects into the arc groove 48 of the base 2. The arc groove 48 is formed along an air formed around a center line of the shaft 10 like the arc groove 37.

Figure 12:
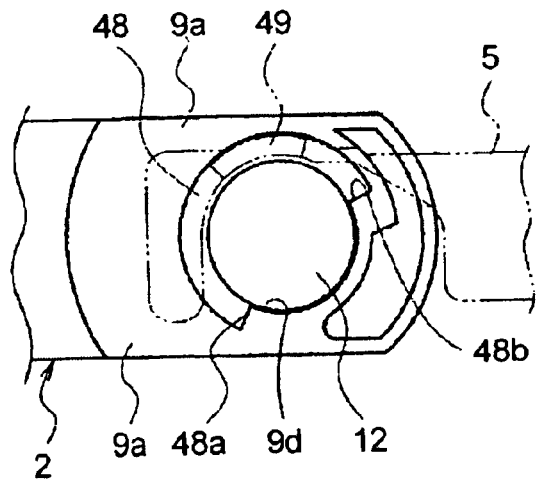
FIG. 12 is an explanatory view that shows the stopper mechanism when the mirror assembly is in a position where it is used (hereinafter, "usage position")
Figure 13:
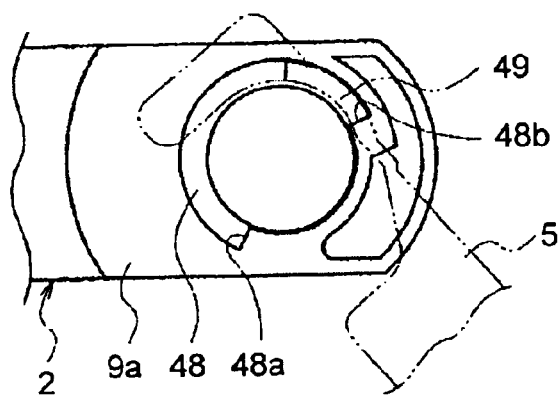
FIG. 13 is an explanatory view that shows the stopper mechanism when the mirror assembly is in a rear retracting position.

Operation of the stopper mechanism will be explained below. When the mirror assembly 3 is in the usage position C, the projection 49 is located in a substantially intermediate portion of the arc groove 48 as shown in FIG. 12. At that time, the mirror assembly 3 is turned rearward (in a direction of an arrow D in FIG. 16) manually or by an external force. With this turning operation, the clutch mechanism 24 is brought into the disengaged state, and the mirror assembly 3 is turned rearward. Then, when the projection 49 of the bracket 5 abuts against the one end 48b of the arc groove 48 of the base 2, the turning motion of the mirror assembly 3 is stopped, and the mirror assembly 3 is located in the rear retracting position B. The mirror assembly 3 is turned forward (in a direction of an arrow E in FIG. 16) manually or by an external force.

Figure 14:
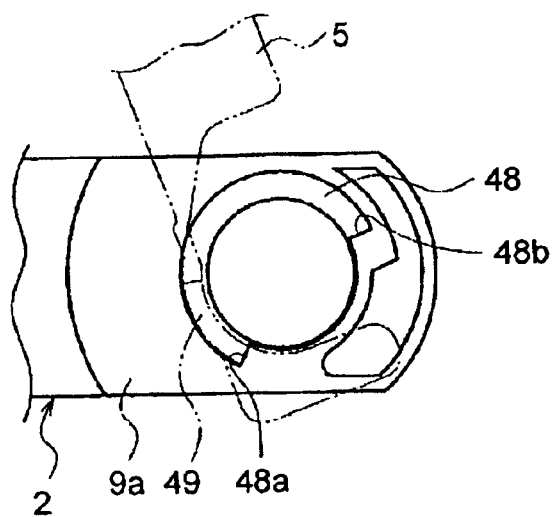
FIG. 14 is an explanatory view that shows the stopper mechanism when the mirror assembly is in a front retracting position.

With this turning motion, the clutch mechanism 24 is brought into the disengaged state and the rolling element 38 held by the retainer 39 of the turning member 20 is separated from the arc groove 37 of the flange 12 of the shaft 10 by the clutch mechanism 24 as shown in the phantom line in FIG. 15. With this operation, the mirror assembly 3 freely turns forward independently of the arc groove 39. Then, when the projection 49 of the bracket 5 abuts against the other end 48a of the arc groove 48 of the base 2 as shown in FIG. 14, the turning motion of the mirror assembly 3 is stopped, and the mirror assembly 3 is located in the front retracting position A. That is, the mirror assembly 3 is accommodated in the accommodating position (front retracting position or rear retracting position).

According to the outer mirror 1, in the stopper mechanism for accommodating the mirror assembly, the projection 49 is provided on the bracket 5 on the side of the mirror assembly 3, and the base 2 is provided with the arc groove 48. Therefore, the projection 49 of the stopper mechanism does not exist on the side of the base 2. Thus, the base 2 and a metal mold do not interfere with each other when the base 2 is produced, and the base 2 can be formed by a metal mold in a usual manner. Moreover, since it is unnecessary to split the base 2 into two pieces when the base is molded using a metal mold, the cost of manufacturing becomes low as compared with a conventional outer mirror for a vehicle in which it is necessary to split the base into two pieces when the base is molded using a metal mold.

The turning unit 7 is not provided with the arc groove 48 of the stopper mechanism and the projection 49, but the horizontal portion 9 of the base 2 and the mirror assembly 3 are provided with the arc groove 48 of the stopper mechanism and the projection 49. Therefore, the stopper mechanism for the left outer mirror (the front retracting position exists in the counterclockwise direction with respect to the usage position) and the stopper mechanism for the right outer mirror (the front retracting position A is in the clockwise direction with respect to the usage position C as shown in FIG. 16) are not provided on the turning unit 7, but can be provided on a left base (not shown) and a left mirror assembly (not shown) and on the right base 2 and the right mirror assembly 3, respectively. As a result, in the outer mirror 1, the turning unit 7 can be used for both the left and right outer mirrors.

In other words, a turning angle between the rear retracting position B and the usage position C of the mirror assembly 3 is the same in the left outer mirror and the right outer mirror, the turning unit 7 can be used for both the left and right outer mirrors. At that time, in the right outer mirror, as shown in FIG. 15, when the mirror assembly 3 is located in the rear retracting position B, the rolling element 38 is located on the one end 37a of the arc groove 37, and when the mirror assembly 3 is located in the usage position C, the rolling element 38 is located on the other end 37b of the arc groove 37. In the left outer mirror, when the mirror assembly 3 is located in the rear retracting position B, the rolling element 38 is located on the other end 37b of the arc groove 37, and when the mirror assembly 3 is located in the usage position C, the rolling element 38 is located on the one end 37a of the arc groove 37.

If the stopper mechanism is provided on the turning unit 7, in the right outer mirror, the end 48a of the arc groove 48 in the front retracting position A must be provided rightward of the other end 37b of the arc groove 37 in FIG. 15, and in the left outer mirror, the end 47a of the arc groove 48 in the front retracting position A must be provided leftward of the one end 37a of the arc groove 37 in FIG. 15. Therefore, if the stopper mechanism is provided on the turning unit 7, a turning unit for the right outer mirror and a turning unit for the left outer mirror are required. As a result, the arc groove 48 and the projection 49 of the stopper mechanism are not provided on the turning unit 7 but provided on the horizontal portion 9 of the base 2 and the mirror assembly 3. With this structure, the turning unit 7 can be used for both the left and right outer mirrors.

Since the projection 49 of the stopper mechanism is formed on the bracket 5 on the side of the mirror assembly 3, it is unnecessary to provide the projection 49 of the stopper mechanism on the housing 4 on the side of the mirror assembly 3. Therefore, in the outer mirror 1, since the housing 4 which is to be coated is not provided with the projection 49, the coating does not come off.

Since the projection 49 is formed on the bracket 5, which is made from material that has higher strength than other parts such as the housing 4, the outer mirror 1 has excellent strength and endurance.

The projection 49 of the stopper mechanism is provided on the bracket 5 on the side of the mirror assembly 3, however, the projection may not be provided on the bracket. For example, the projection may project from a member constituting the mirror assembly 3, the turning member 20 of the turning unit 7, the housing 4 or a casing 62 of the tilting unit 6.

The turning unit 7 and the tilting unit 6 are electric units (that is, the turning unit 7 and the tilting unit 6 operate with electric power), however, the turning unit and the tilting unit may be configured to operate with manually.

The bracket 5 and the housing 4 have been shown as independent members, however, the bracket and the housing may be integrated using resin. That is, the turning unit and the tilting unit may be fixed directly to the housing.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application claims priority from Japanese Patent Application 2002-163474, filed Jun. 4, 2002, which is incorporated herein by reference in its entirety.

What is claimed is:

1. An outer mirror for a vehicle, comprising
   a base having a first portion fixed to a body of the vehicle and a second portion fixed to and extending from the first portion;
   a turning unit having a shaft fixed to the second portion and a turning member turnably mounted on the shaft;

a mirror assembly fixed to the turning member and which can turn around the shaft between a front retracting position and a rear retracting position; and a stopper mechanism which limits a turning motion of the mirror assembly between the front retracting position and the rear retracting position, wherein the stopper mechanism includes an arc groove, having two ends, provided in the second portion and a projection provided on the mirror assembly and which abuts against the ends of the arc groove to stop the turning motion of the mirror assembly.

2. The outer mirror according to claim 1, wherein the mirror assembly comprises:

a mirror body that has a reflecting surface;

a tilting unit which tiltably supports the mirror body;

a housing that has a rear opening; and a bracket fixed in the housing, wherein the turning member is fixed to the bracket, the tilting unit is fixed to the bracket, the mirror body is located in the rear opening of the housing, and the projection of the stopper mechanism is provided on the bracket.

3. The outer mirror according to claim 2, wherein the bracket is made of material that has higher strength than that of the housing.

4. The outer mirror according to claim 2, wherein the tilting unit comprises:

a casing fixed to the bracket;

a ball joint which tiltably supports the mirror body in the casing;

a vertically advancing/retreating rod and a laterally advancing/retreating rod which are provided in the casing such that these rods can advance and retreat; and a vertically driving unit and a laterally driving unit which are disposed in the casing, which allow the vertically advancing/retreating rod and the laterally advancing/retreating rod to advance and retreat by operating a remote control switch, and which vertically and laterally tilt the mirror body.

5. The outer mirror according to claim 1, wherein the mirror assembly comprises:

a mirror body that has a mirror body having a reflecting surface;

a tilting unit which tiltably supports the mirror body; and a housing that has a rear opening, wherein the turning member and the tilting unit are fixed to the housing, the mirror body is located in the rear opening, and the projection of the stopper mechanism is provided on the housing or the tilting unit.

6. The outer mirror according to 5, wherein the tilting unit comprises:

a casing fixed to the bracket;

a ball joint which tiltably supports the mirror body in the casing;

a vertically advancing/retreating rod and a laterally advancing/retreating rod which are provided in the casing such that these rods can advance and retreat; and a vertically driving unit and a laterally driving unit which are disposed in the casing, which allow the vertically advancing/retreating rod and the laterally advancing/retreating rod to advance and retreat by operating a remote control switch, and which vertically and laterally tilt the mirror body.

7. The outer mirror according to claim 1, wherein the turning unit comprises:

a motor which is provided in the turning member and driven by operating a remote control switch;

a driving-force transmitting mechanism which is provided between the motor and the shaft and which can turn the mirror assembly by the motor;

a clutch mechanism which is provided between a speed reducer and the shaft, and which can turn the mirror assembly without applying an excessive load to the motor when an external force is applied to the mirror assembly;

a positioning mechanism which is provided between the shaft and the turning member, and which stops the mirror assembly in a usage position located substantially intermediate portion between the front retracting position and the rear retracting position, or in the rear retracting position B; and a switch circuit which cuts off current to the motor when the mirror assembly is located in the usage position or the rear retracting position.

8. The outer mirror for a vehicle comprising:

a base projecting from a side surface of a body of the vehicle;

a mirror assembly that can turn around a shaft fixed to the base between two positions; and a stopper mechanism that limits a turning motion of the mirror assembly in the two positions, wherein the stopper mechanism includes an arc groove formed in the base, and a projection projecting from the mirror assembly into the arc groove.

9. The outer mirror according to claim 8, wherein the mirror assembly comprises a housing having a rear opening from where a reflection plate is exposed, a bracket fixed in the housing, and a turning unit held by the bracket, the turning unit comprises a shaft fixed to the base, and a turning member that is turnably mounted on the shaft and fixed to the bracket so that the mirror assembly turns in unison with the turning member, the projection of the stopper mechanism projects from the bracket.

* * * * *